US012562503B2

(12) United States Patent
Li

(10) Patent No.: US 12,562,503 B2
(45) **Date of Patent: *Feb. 24, 2026**

(54) DUAL-POLARIZED RADIATING ELEMENTS HAVING INDUCTORS COUPLED BETWEEN THE DIPOLE RADIATORS AND BASE STATION ANTENNAS INCLUDING SUCH RADIATING ELEMENTS

(71) Applicant: Outdoor Wireless Networks LLC, Claremont, NC (US)

(72) Inventor: Haifeng Li, Richardson, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,667

(22) Filed: Jul. 11, 2024

(65) Prior Publication Data

US 2024/0372270 A1 Nov. 7, 2024

Related U.S. Application Data

(63) Continuation of application No. 17/905,887, filed as application No. PCT/US2021/023465 on Mar. 22, 2021, now Pat. No. 12,062,855.

(60) Provisional application No. 63/000,554, filed on Mar. 27, 2020.

(51) Int. Cl.
*H01Q 1/24* (2006.01)
*H01Q 9/28* (2006.01)
*H01Q 21/26* (2006.01)

(52) U.S. Cl.
CPC ............ *H01Q 21/26* (2013.01); *H01Q 1/246* (2013.01); *H01Q 9/28* (2013.01)

(58) Field of Classification Search
CPC .......... H01Q 21/26; H01Q 1/246; H01Q 9/28; H01Q 5/48; H01Q 9/065; H01Q 9/26; H01Q 19/108; H01Q 21/062
See application file for complete search history.

(56) References Cited

U.S. PATENT DOCUMENTS 9,077,070 B2 7/2015 Zimmerman et al.
9,905,973 B2 2/2018 Schumacher
2017/0062940 A1 3/2017 Cao
2018/0034164 A1* 2/2018 Jang .................... H01Q 15/246
2018/0309204 A1 10/2018 Ng et al.
2018/0323513 A1 11/2018 Varnoosfaderani et al.
2019/0280377 A1 9/2019 Zhang et al.
(Continued)

FOREIGN PATENT DOCUMENTS

WO 2015124573 A1 8/2015
WO 2018203961 A1 11/2018

OTHER PUBLICATIONS

"International Search Report and Written Opinion of the International Searching Authority", International Application No. PCT/US2021/0234656, Jul. 12, 2021, 12 pp.

*Primary Examiner* — David E Lotter
(74) *Attorney, Agent, or Firm* — Myers Bigel, P.A.

(57) ABSTRACT

A dual-polarized radiating element for a base station antenna includes a first dipole radiator that comprises a first dipole arm and a third dipole arm and a second dipole radiator that comprises a second dipole arm and a fourth dipole arm. The radiating element further includes a first inductor that is coupled between the first dipole arm and the second dipole arm.

17 Claims, 10 Drawing Sheets

(56) References Cited

U.S. PATENT DOCUMENTS

| | | | |
|---|---|---|---|
| 2021/0305721 A1 | 9/2021 | Li et al. | |
| 2021/0344122 A1 | 11/2021 | Kaistha et al. | |
| 2022/0109238 A1* | 4/2022 | Varnoosfaderani | H01Q 1/2283 |
| 2022/0190487 A1* | 6/2022 | Sun | H01Q 21/062 |

* cited by examiner

DUAL-POLARIZED RADIATING ELEMENTS HAVING INDUCTORS COUPLED BETWEEN THE DIPOLE RADIATORS AND BASE STATION ANTENNAS INCLUDING SUCH RADIATING ELEMENTS

RELATED APPLICATION(S)

The present application is a continuation application under 35 U.S.C. § 120 of U.S. patent application Ser. No. 17/905,887, filed Mar. 22, 2021, which in turn is a 35 U.S.C. § 371 national stage application of PCT Application No. PCT/US2021/023465, filed on Mar. 22, 2021, which itself claims priority to and the benefit of U.S. Provisional Application Ser. No. 63/000,554, filed Mar. 27, 2020, the disclosure of both of which are hereby incorporated herein in their entireties as if set forth fully herein.

BACKGROUND

The present invention generally relates to radio communications and, more particularly, to base station antennas for cellular communications systems Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the horizontal plane that is defined by the horizon. Reference will also be made to (1) the azimuth plane, which is a horizontal plane that bisects the base station antenna, and (2) the elevation plane, which is a plane extending along the boresight pointing direction of the antenna that is perpendicular to the azimuth plane.

Typically, each base station antenna will include one or more so-called "linear arrays" of radiating elements that includes a plurality of radiating elements that are arranged in a generally vertically-extending column. The radiating elements used in most modern base station antennas are dual-polarized radiating elements that are designed to transmit and receive RF signals at two different polarizations. The use of dual-polarized radiating elements increases the capacity of a base station antenna as it allows the antenna to transmit and receive twice as many signals with only a small increase in the size of the radiating elements.

FIG. 1A schematically depicts the dipole radiators of a conventional dual-polarized radiating element 10. As shown in FIG. 1A, the radiating element 10 includes a first dipole radiator 20-1 that is configured to transmit and receive vertically polarized RF signals and a second dipole radiator 20-2 that is configured to transmit and receive horizontally polarized RF signals. First and second independent feed networks (not shown) are provided that pass RF signals between dipole radiators 20-1, 20-2 and respective radio ports. FIG. 1B schematically depicts the dipole radiators of another conventional dual-polarized radiating element 30 that includes a first dipole radiator 40-1 that is configured to transmit and receive RF signals having a slant −45° polarization and a second dipole radiator 20-2 that is configured to transmit and receive RF signals having a slant +45° polarization. Theoretically, horizontally polarized and vertically polarized RF signals are orthogonal to each other, meaning that a horizontally polarized RF signal and a vertically polarized RF signal that are transmitted at the exact same time, at the exact same frequency, from the exact same location will not interfere with each other. The same is theoretically true for slant −45° polarized RF signals and slant +45° polarized RF signals. In practice, however, the dipole radiators do not necessarily transmit only at a single polarization (e.g., an RF signal transmitted by a vertical dipole will typically have at least a small horizontally polarized component) and portions of the transmitted RF signal that reflect off of other structures within the antenna (e.g., the reflector of the antenna, adjacent radiators, the antenna radome, etc.) or along the channel between the base station antenna and a user device that is communicating with the base station antenna tend to experience some degree of "depolarization" where the polarization of the RF energy changes to other polarizations. As such, the amount of isolation between the two "orthogonal" polarizations transmitted and received by a dual-polarized radiating element in practice is more typically on the order of 5-15 dB. The lack of complete isolation between the two "orthogonal" polarizations reduces the performance of a base station antenna, as the RF energy converted to the unintended polarization reduces the gain of the antenna and appears as interference to the RF signals at the "orthogonal" polarization.

SUMMARY

Pursuant to some embodiments of the present invention, dual-polarized radiating elements for base station antennas are provided that include a first dipole radiator that comprises a first dipole arm and a third dipole arm and a second dipole radiator that comprises a second dipole arm and a fourth dipole arm. These radiating elements further include a first inductor that is coupled between the first dipole arm and the second dipole arm. The first dipole arm may be adjacent the second dipole arm.

In some embodiments, the first dipole arm, the second dipole arm and the first inductor may be formed on a printed circuit board. In some embodiments, the first inductor may be implemented as a meandered trace segment that extends between the first dipole arm and the second dipole arm.

In some embodiments, each conductive loop may include a first conductive segment and a second conductive segment that each extend from a central region of the printed circuit board toward an outer periphery of the printed circuit board, and the first inductor may be coupled between a middle region of the first conductive segment of the first dipole arm and a middle region of the second conductive segment of the second dipole arm.

The dual-polarized radiating element may further include a second inductor that is coupled between the second dipole arm and the third dipole arm, a third inductor that is coupled between the third dipole arm and the fourth dipole arm, and a fourth inductor that is coupled between the fourth dipole arm and the first dipole arm.

The first inductor may be within a footprint of the dual-polarized radiating element. In some embodiments, the inductance of the first inductor may be selected to increase isolation between the first and second dipole radiators.

In some embodiments, each of the first through fourth dipole arms may form a conductive loop. In such embodiments, the dipole arms may be cloaked dipole arms where the dipole arms each include a plurality of spaced-apart conductive members that are connected to each other via respective inductive trace segments. The first inductor and the inductive trace segments may, for example, each be implemented as meandered trace segments, and the meandered trace segment forming the first inductor may be longer than any of the meandered trace segments forming the respective inductive trace segments in some embodiments. An inductance of the first inductor may exceed an inductance of any of the inductive trace segments in the first and second dipole arms.

The first and second dipole arms may be implemented as first and second conductive patterns on a first side of the printed circuit board and the first inductor may be implemented as a third conductive pattern on a second side of the printed circuit board that is opposite the first side, where the first inductor is electrically connected to the first and second dipole arms via at least first and second plated-through holes that extend through a dielectric layer of the printed circuit board.

In some embodiments, the first dipole arm may generally extend along a first axis and the second dipole arm may generally extend along a second axis that is different from the first axis, and the third dipole arm may generally extend along the first axis and the fourth dipole arm may generally extend along a third axis, where the third axis is different from both the first axis and the second axis.

In some embodiments, the first through fourth dipole arms may meet in a central region of the radiating element, and the third dipole arm may extend upwardly from the central region, the fourth dipole arm may extend downwardly from the central region, and the first and second dipole arms may both extend laterally from the same side of the central region.

In some embodiments, the first dipole radiator may be configured to transmit RF radiation having slant −45° polarization, and the second dipole radiator may be configured to transmit RF radiation having slant +45° polarization.

In some embodiments, the first dipole radiator may extend along a first axis and the second dipole radiator may extend along a second axis that is perpendicular to the first axis, and an axis that extends through the intersection of the first and second axes and that is offset by 45° from each of the first and second axes may intersect the first inductor.

Pursuant to further embodiments of the present invention, dual-polarized radiating elements are provided that include a feed stalk and a dipole printed circuit board that is mounted on the feed stalk. The dipole printed circuit board includes a first dipole radiator that comprises a first dipole arm and a third dipole arm, a second dipole radiator that comprises a second dipole arm and a fourth dipole arm, and a first metal trace that electrically connects the first dipole arm to the second dipole arm. An average width of the first metal trace is less than one third an average width of a first portion of the first dipole arm.

The first metal trace may be a meandered conductive trace. The first metal trace may be within a footprint of the dual-polarized radiating element.

In some embodiments, the first and second dipole arms may be implemented as first and second conductive patterns on a first side of the printed circuit board and the first metal trace may be implemented as a third conductive pattern on a second side of the printed circuit board that is opposite the first side. In some embodiments, the first metal trace may be electrically connected to the first and second dipole arms via at least first and second plated-through holes that extend through a dielectric layer of the printed circuit board.

The dual-polarized radiating element may further include a second metal trace coupled between the second dipole arm and the third dipole arm, a third metal trace coupled between the third dipole arm and the fourth dipole arm, and a fourth metal trace coupled between the fourth dipole arm and the first dipole arm.

Pursuant to further embodiments of the present invention, dual-polarized radiating elements for a base station antenna are provided that include a first dipole radiator that includes a plurality of spaced-apart first widened conductive members that are connected to each other via respective first narrow trace segments and a second dipole radiator that includes a plurality of spaced-apart second widened conductive members that are connected to each other via respective second narrow trace segments. A third narrow trace segment is directly coupled between the first dipole radiator and the second dipole radiator. At least a portion of the third narrow trace segment is positioned between one of the first widened conductive members and one of the second widened conductive members.

In some embodiments, the first dipole radiator, the second dipole radiator and the third narrow trace segment may be formed on a dipole radiator printed circuit board.

In some embodiments, a length of the third narrow trace segment may be at least twice an average length of the first narrow trace segments and may be at least twice an average length of the second narrow trace segments.

In some embodiments, the first dipole radiator includes a first dipole arm and a third dipole arm, and the second dipole radiator includes a second dipole arm and a fourth dipole arm, and the third narrow trace segment is connected between the first dipole arm and the second dipole arm.

DETAILED DESCRIPTION

Figure 1A:
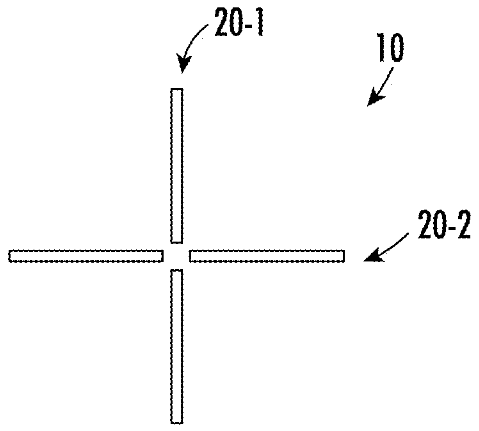
FIG. 1A is a schematic front view of a conventional dual-polarized radiating element that includes first and second dipole radiators that are configured to transmit and receive vertically and horizontally polarized RF signals, respectively.
Figure 1B:
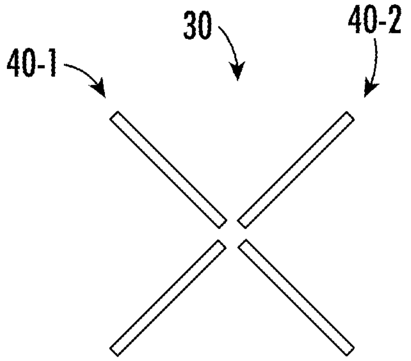
FIG. 1B is a schematic front view of a conventional dual-polarized radiating element that includes first and second dipole radiators that are configured to transmit and receive slant −45° polarized and slant +45° polarized RF signals, respectively.

Pursuant to embodiments of the present invention, dual-polarized dipole radiating elements are provided that have an inductor coupled between a first dipole arm of the first dipole radiator and a first dipole arm of the second dipole radiator. The inductor may improve the radiation pattern that is generated by the radiating element by adjusting the current distribution on the dipole radiators. As a result, the radiating elements may exhibit improved cross-polarization isolation, and may also exhibit improved return loss performance.

Typically, a dual-polarized dipole radiating element includes a first dipole radiator that includes first and third dipole arms and a second dipole radiator that includes second and fourth dipole arms. In the radiating elements according to embodiments of the present invention, at least one inductor may be provided that is coupled between, for example, the first dipole arm and the second dipole arm. In some embodiments, the radiating elements may include more than one inductor. For example, the radiating elements may include a first inductor that is coupled between the first and second dipole arms, a second inductor that is coupled between the second and third dipole arms, a third inductor that is coupled between the third and fourth dipole arms, and a fourth inductor that is coupled between the fourth and first dipole arms. The inductors may be implemented, for example, as meandered traces on a printed circuit board that includes the dipole arms of the dipole radiators.

According to some embodiments, dual-polarized radiating elements for base station antennas are provided that include a first dipole radiator that comprises a first dipole arm and a third dipole arm and a second dipole radiator that comprises a second dipole arm and a fourth dipole arm. These radiating elements further include a first inductor that is coupled between the first dipole arm and the second dipole arm.

In other embodiments, dual-polarized radiating elements are provided that include a feed stalk and a dipole printed circuit board that is mounted on the feed stalk. The dipole printed circuit board includes a first dipole radiator that comprises a first dipole arm and a third dipole arm, a second dipole radiator that comprises a second dipole arm and a fourth dipole arm, and a first metal trace that electrically connects the first dipole arm to the second dipole arm. An average width of the first metal trace is less than one-third of an average width of a first portion of the first dipole arm.

In still other embodiments, dual-polarized radiating elements are provided that include a first dipole radiator that includes a plurality of spaced-apart first widened conductive members that are connected to each other via respective first narrow trace segments and a second dipole radiator that includes a plurality of spaced-apart second widened conductive members that are connected to each other via respective second narrow trace segments. A third narrow trace segment is directly coupled between the first dipole radiator and the second dipole radiator. At least a portion of the third narrow trace segment is positioned between one of the first widened conductive members and one of the second widened conductive members Embodiments of the present invention will now be described in further detail with reference to FIGS. 2A-9.

Figure 2A:
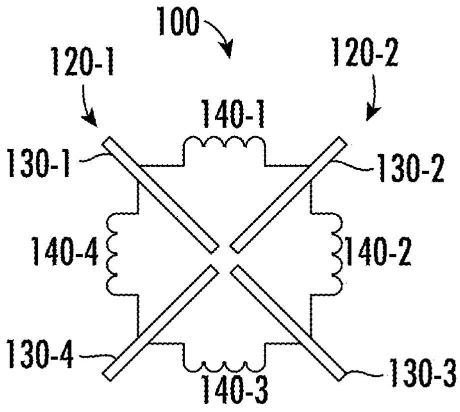
FIG. 2A is a schematic front view of a dual-polarized radiating element according to embodiments of the present invention.

FIG. 2A is a schematic front view of a dual-polarized "cross-dipole" radiating element 100 according to embodiments of the present invention. As shown in FIG. 2A, the dual polarized radiating element 100 includes a first dipole radiator 120-1 and a second dipole radiator 120-2. While not shown in FIG. 2A, the radiating element 100 includes a feed stalk that may be used to mount the first and second dipole radiators 120-1, 120-2 forwardly from a reflector of a base station antenna. The feed stalk may comprise, for example, a pair of printed circuit boards that include RF transmission lines or a pair of coaxial cables. The feed stalk is used to feed RF signals to and from the respective dipole radiators 120.

The first dipole radiator 120-1 includes a first dipole arm 130-1 and a third dipole arm 130-3 that are arranged in collinear fashion. The second dipole radiator 120-2 includes a second dipole arm 130-2 and a fourth dipole arm 130-4 that are arranged in collinear fashion. The first and third dipole arms 130-1, 130-3 are center fed (i.e., an RF feed signal is fed to the dipole arms 130 from the center of the radiating element 100) via, for example a first RF transmission line structure on the feed stalk and the second and fourth dipole arms 130-2, 130-4 are center fed via, for example a second RF transmission line structure on the feed stalk. A longitudinal axis of the first dipole radiator 120-1 is rotationally offset from a longitudinal axis of the second dipole radiator 120-2 by 90° so that the two dipole radiators 120 will operate at orthogonal polarizations. In FIG. 2A, the dipole radiators 120-1, 120-2 are oriented so that they will operate as slant −45° polarization and slant +45° polarization dipole radiators, respectively. However, it will be appreciated that this is just an example, and that the radiating elements according to embodiments of the present invention may be designed to operate at any suitable polarizations. For example, the radiating element 100 could be rotated by 45° so that the dipole radiators 120-1, 120-2 would instead have respective horizontal and vertical polarizations.

As is further shown in FIG. 2A, an inductor 140-1 is coupled between the first dipole arm 130-1 and the second dipole 130-2, an inductor 140-2 is coupled between the second dipole arm 130-2 and the third dipole 130-3, an inductor 140-3 is coupled between the third dipole arm 130-3 and the fourth dipole 130-4, and an inductor 140-4 is coupled between the fourth dipole arm 130-4 and the first dipole 130-1. These inductors 140 may balance the current distribution on the dipole arms 130 and can lead to improvements in the cross-polarization isolation between the dipole radiators 120.

Figure 2B:
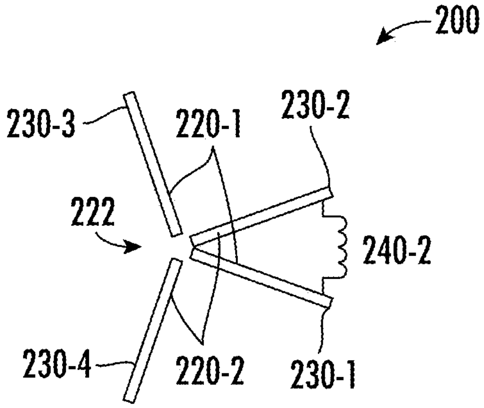
FIG. 2B is a schematic front view of a dual-polarized radiating element according to further embodiments of the present invention.

FIG. 2B is a schematic front view of a dual-polarized radiating element 200 according to further embodiments of the present invention. The dual-polarized radiating element 200 is a modified version of a known dual-polarized radiating element that has conventionally been referred to as a "tri-pole" radiating element. U.S. Pat. No. 9,077,070 ("the '070 patent"), the entire content of which is incorporated herein by reference, depicts various conventional tri-pole radiating elements. As can be seen from the '070 patent, a conventional tri-pol radiating element has three arms: namely a pair of collinear side arms and a central arm. The length of each arm is about one quarter wavelength of the center frequency of the operating frequency band. The first side arm and the central arm form a first dipole radiator, and the second side arm and the central arm form a second dipole radiator.

As shown in FIG. 2B, the modified tri-pol radiating element 200 includes first and second dipole radiators 220-1, 220-2, which may be mounted on a feed stalk (not shown). The first dipole radiator 220-1 includes first and third dipole arms 230-1, 230-3, and the second dipole radiator 220-2 includes second and fourth dipole arms 230-2, 230-4. The first through fourth dipole arms 230-1 through 230-4 each extend from a central region of the radiating element 222, which is where the feed stalks electrically connect to the dipole arms 230. The third dipole arm 230-3 extends generally upwardly from the central region 222, the fourth dipole arm 230-4 extends generally downwardly from the central region 222, and the first and second dipole arms 230-1, 230-2 both extend generally laterally to a first side of the central region 222. Dipole radiator 220-1 is configured to emit RF energy having a slant +45° polarization while dipole radiator 220-2 is configured to emit RF energy having a slant −45° polarization.

An inductor 240 is coupled between the first dipole arm 230-1 and the second dipole arm 230-2. In the depicted embodiment, the inductor 240 connects near respective end portions of dipole arms 230-1, 230-2, although embodiments of the present invention are not limited thereto. The inductor 240 may balance the current distribution on the dipole arms 230 and can lead to improvements in the cross-polarization isolation between the dipole radiators 220. The inductor 240 may be particularly beneficial in radiating element 200 since it can be used to compensate for current imbalances that result from asymmetrical nature of the dipole radiator design. For example, dipole arms 230-1 and 230-2 are in close proximity to each other and hence can couple resulting in distortions in the radiation pattern. The inductor 240 may be used to adjust the current distribution on the excited dipole arms 230 in order to compensate and improve the radiation patterns of the dipole radiators 220.

While the tri-pol radiating element 200 includes four dipole arms, it is nevertheless referred to herein as a "tri-pol" radiating element or as "modified tri-pol" radiating element since the overall design of the radiating element is more akin to a conventional tri-pol radiating element than it is to a convention cross-polarized radiating element. This convention will be used with respect to each modified tri-pol radiating element discussed herein.

Figure 3A:
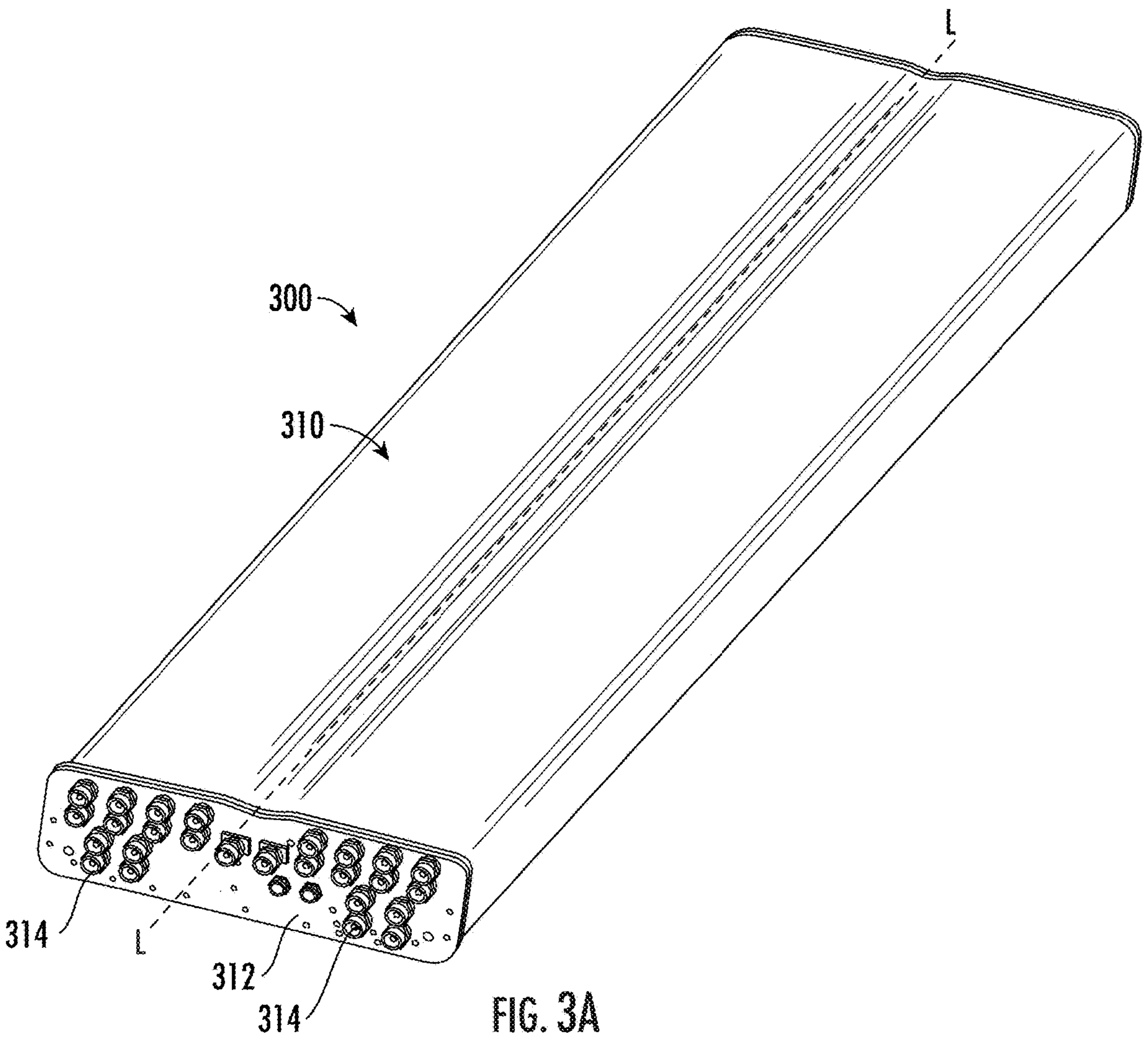
FIG. 3A is a perspective view of a base station antenna according to embodiments of the present invention.
Figure 3B:
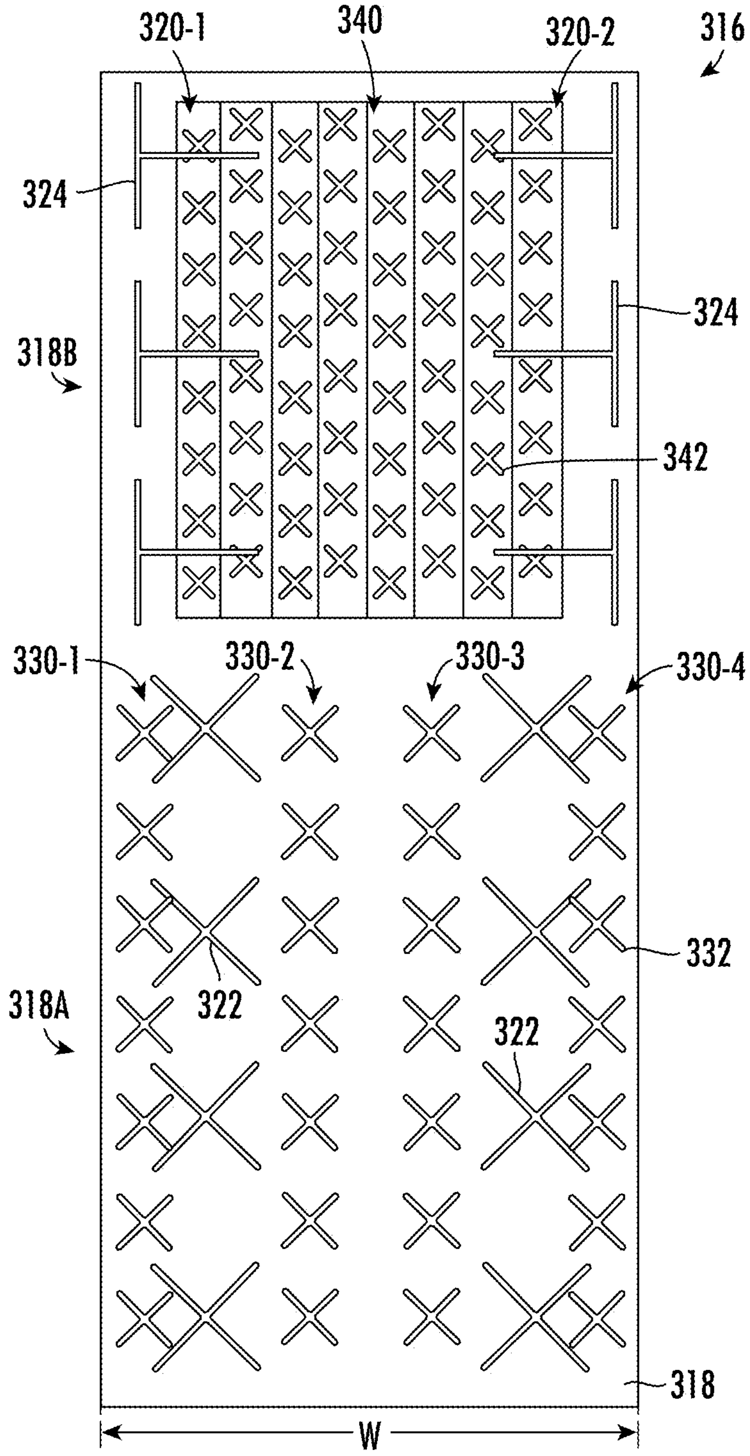
FIG. 3B is a schematic front view of the base station antenna of FIG. 3A with the radome removed that illustrates the arrays of radiating elements included in the antenna.

FIGS. 3A and 3B illustrate a base station antenna 300 according to certain embodiments of the present invention. In particular. FIG. 3A is a perspective view of the base station antenna 300, while FIG. 3B is a front view of the base station antenna 300 with the radome removed that schematically illustrates the linear arrays of radiating elements included in the antenna 300.

As shown in FIG. 3A, the base station antenna 300 is an elongated structure that extends along a longitudinal axis L. The base station antenna 300 may have a tubular shape with a generally rectangular cross-section. The antenna 300 includes a radome 310 and a bottom end cap 312. A plurality of RF connectors 314 may be mounted in the bottom end cap 312. The antenna 300 is typically mounted in a vertical configuration (i.e., the longitudinal axis L may be generally perpendicular to a plane defined by the horizon when the antenna 300 is mounted for normal operation).

Referring to FIG. 3B, the base station antenna 300 includes an antenna assembly 316 that may be slidably inserted into the radome 310. The antenna assembly 316 includes a backplane structure 318 that may act as both a ground plane and as a reflector for the antenna 300.

First and second low-band linear arrays 320-1, 320-2 that each include a plurality of low-band radiating elements are mounted to extend forwardly from the reflector 318. Two different styles of low-band radiating elements, namely low-band radiating elements 322 and low-band radiating element 324, are included in each low-band linear array 320. First through fourth mid-band linear arrays 330-1 through 330-4 that each include a plurality of mid-band radiating elements 332 are also mounted to extend forwardly from the reflector 318. The first and fourth mid-band linear arrays 330-1, 330-4 are mounted on the left and right edges of the reflector 318, outside of the respective first and second low-band linear arrays 320-1, 320-2. The second and third mid-band linear arrays 330-2, 330-3 are mounted between the first and second low-band linear arrays 320-1, 320-2.

The first and second low-band linear arrays 320-1, 320-2 each extend for substantially the full length of the reflector 318. The first through fourth mid-band linear arrays 330-1 through 330-4 are mounted along a lower portion 318A of the reflector 318, and do not extend for the full length of the reflector 318. Low-band radiating elements 322 are cross-dipole radiating elements that include first and second dipole radiators that are arranged at angles of +45° and −45° with respect to the horizon when the base station antenna 300 is mounted for use. An example embodiment of one low-band radiating element 322 will be discussed below with reference to FIGS. 7A-7B. The bottom four low-band radiating elements of each low-band linear array 320 are implemented as radiating elements 322. Low-band radiating elements 324 are modified tri-dipole radiating elements, and an example embodiment of one low-band radiating element 324 will be discussed below with reference to FIGS. 4A-4B.

The base station antenna 300 further includes a multi-column array 340 of upper mid-band radiating elements 342. The multi-column array 340 is positioned between low-band linear arrays 320-1, 320-2 in the upper portion 318B of the antenna 300 between the three modified tri-pol radiating elements 324 that are included in each low-band linear array 320-1, 320-2.

In an example embodiment, the low-band radiating elements 322, 324 may each be configured to transmit and receive signals in at least a portion of the 617-960 MHz frequency range. The mid-band radiating elements 332 may be configured to transmit and receive signals in a higher frequency range than the low-band radiating elements 322, 324, such as the 1427-2690 MHz frequency range or a smaller portion thereof. The upper mid-band radiating elements 342 may be configured to transmit and receive signals in, for example, the 2.5-2.7 GHZ frequency range, although these radiating elements could operate in higher frequency ranges such as the 3.4-3.8 GHz and/or 5.1-5.8 GHz frequency ranges in other embodiments.

All of the radiating elements 322, 324, 332, 342 may comprise dual-polarized radiating elements. Consequently, each array 320, 330, 340 may be used to form two separate antenna beams, namely an antenna beam having a slant +45° polarization and an antenna beam having a slant −45° polarization. It will be appreciated that the radiating elements in some or all of the linear arrays may not be perfectly aligned along a vertical axis but instead some of the radiating elements may be horizontally staggered with respect to other of the radiating elements in a particular array. Such a stagger is shown in FIG. 4B with the tri-pol radiating elements 324 positioned more toward the sides of the reflector 318 than the cross-dipole radiating elements 322.

In order to reduce the width W of antenna 300, the outer columns of radiating elements 342 in multi-column array 340 are in close proximity to the modified tri-pol radiating elements 324. While not shown in FIG. 4B, the low-band radiating elements 324 extend farther forwardly from the reflector 318 than do the upper mid-band radiating elements 342, and portions of the low-band radiating elements 324 may “cover” some of the upper mid-band radiating elements 342, meaning that an axis that is perpendicular to the reflector 318 may extend through both a low-band radiating element 324 and an upper mid-band radiating element 342.

Unfortunately, when the arrays 320, 330, 340 are closely spaced together, undesired interactions may occur between the radiating elements that operate in different frequency bands. For example, radiation emitted by the upper mid-band radiating elements 342 may induce currents on the dipole arms of the nearby low-band radiating elements 322, which may distort the antenna beams generated by the multi-column array 340. In order to reduce or prevent such interaction, the low-band radiating elements 324 may be implemented as so-called “cloaked” radiating elements that are designed to transmit and receive RF signals in the low-band first operating frequency band, while being mostly “transparent” or “invisible” to RF energy in the upper mid-band frequency range. Various cloaked radiating elements are known in the art, with representative cloaked radiating elements being disclosed U.S. Patent Publication No. 2018/0323513 (“the ’513 publication”), filed Feb. 15, 2018 and in U.S. Provisional Patent Application Ser. No. 62/994,962, filed Mar. 26, 2020, the entire content of each of which is incorporated herein by reference. The dipole arms in cloaked radiating elements may be formed as metal patterns that each include a plurality of widened conductive members that are physically and electrically connected by narrow meandered trace segments. The narrowed meandered trace sections act as high impedance sections that allow currents in the operating frequency range of the radiating element to pass between adjacent widened conductive members while interrupting currents associated with radiation emitted by nearby higher frequency band radiating elements that otherwise would be induced on the dipole arms.

Figure 4A:
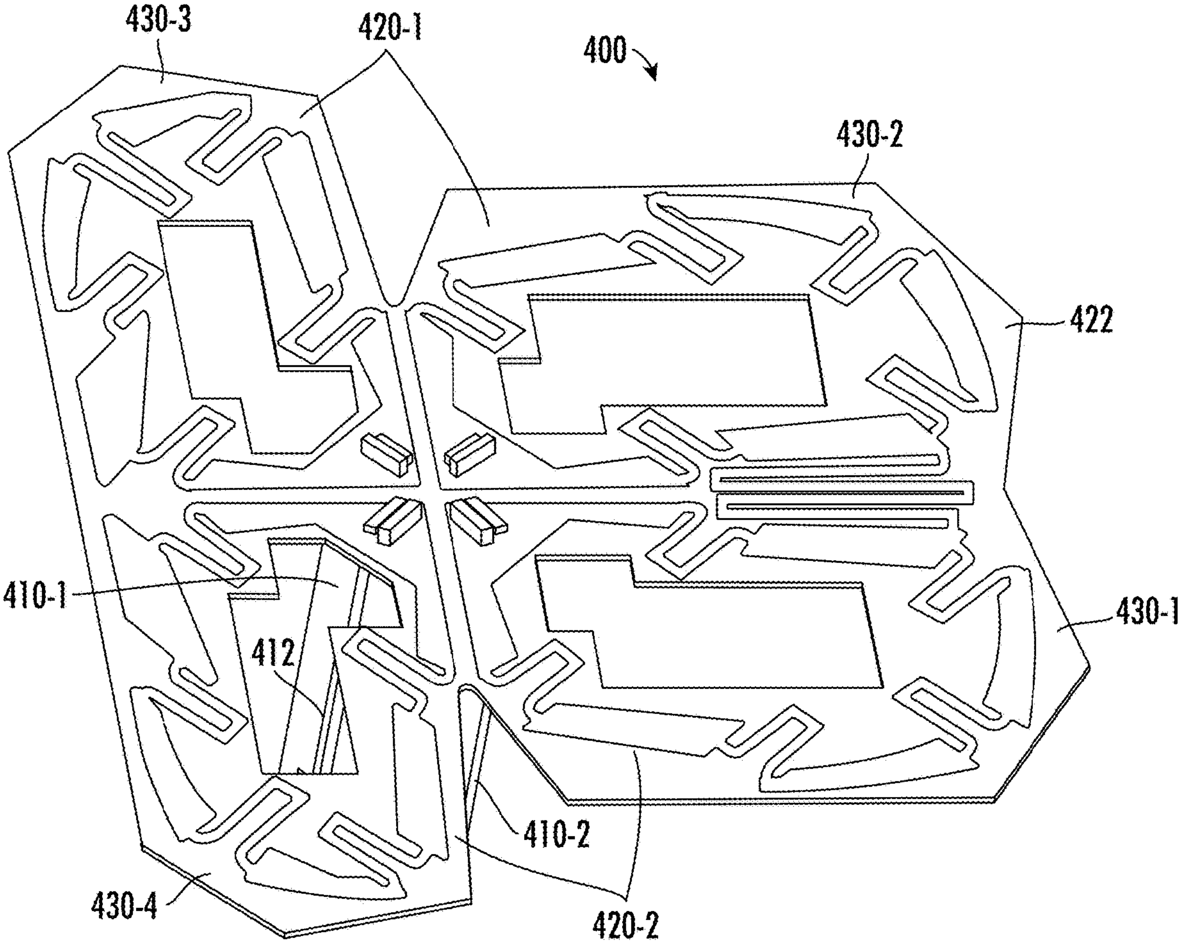
FIG. 4A is a side perspective view of a modified tri-pol low-band radiating element according to embodiments of the present invention that includes an inductive connection between two of the dipole arms thereof.
Figure 4B:
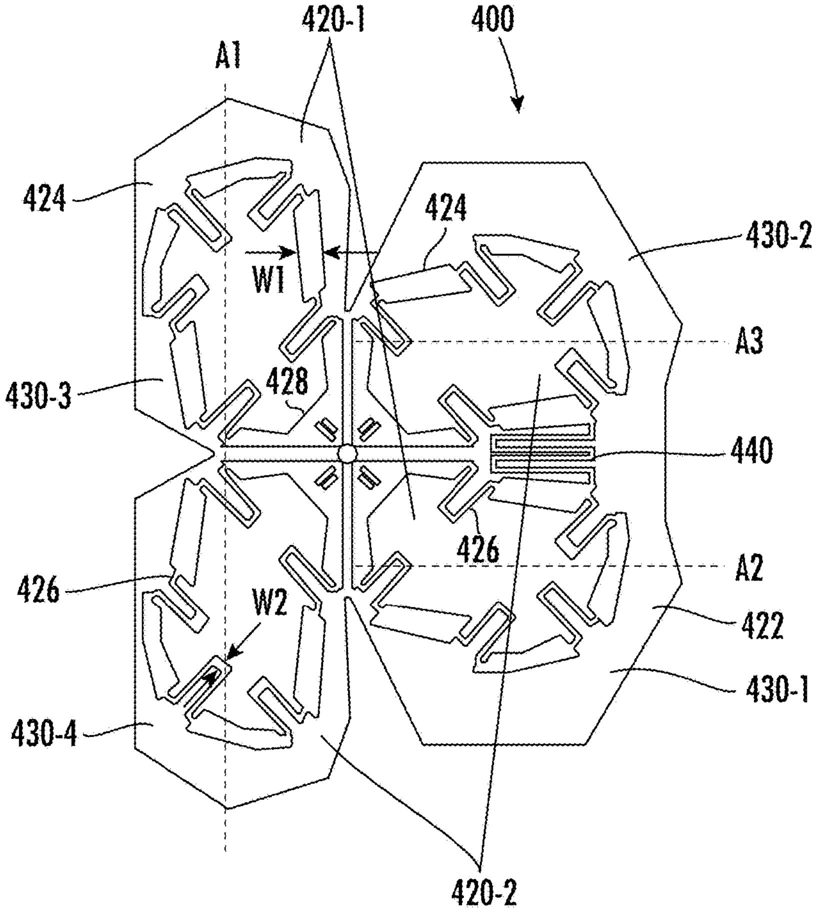
FIG. 4B is a front view of the modified tri-pol low-band radiating element of FIG. 4A.

FIG. 4A is a side perspective view of a modified tri-pol radiating element 400 according to embodiments of the present invention that includes an inductive connection between two of the dipole arms thereof. FIG. 4B is a front view of the modified tri-pol low-band radiating element 400 of FIG. 4A. The radiating element 400 may, for example, be used to implement each of the low-band radiating elements 324 included in base station antenna 300.

Referring to FIGS. 4A-4B, the modified tri-pol low-band radiating element 400 includes a pair of feed stalks 410-1, 410-2, and first and second dipole radiators 420-1, 420-2. The first dipole radiator 420-1 includes first and third dipole arms 430-1, 430-3, and the second dipole radiator 420-2 includes second and fourth dipole arms 430-2, 430-4. As shown in FIG. 4B, the third and fourth dipole arms 430-3, 430-4 generally extend along a first vertical axis A1 and the first and second dipole arms 430-1, 430-2 generally extend along respective second and third axes A2, A3 that are horizontal axes. Thus, the modified tri-pol radiating element 400 includes a first dipole radiator 420-1 that has a third dipole arm 430-3 that generally extends along the first (vertical) axis A1 and a first dipole arm 430-1 that generally extends along a second (horizontal) axis A2, and a second dipole radiator 420-2 that has a fourth dipole arm 430-4 that generally extends along the first vertical axis A1 and a second dipole arm 430-2 that generally extends along a third (horizontal) axis A3. As discussed in the above-referenced ’513 publication, the radiating element 400 may be designed so that equal magnitude currents are excited onto each dipole arm 430-1, 430-3 in response to an RF feed signal, and the average current direction along the dipole radiator 420-1 is such that the combination of the radiation emitted by dipole arm 430-1, 430-3 will have a slant −45° polarization. Similarly, dipole arms 430-2 and 430-4 are designed so that the combination of the radiation emitted thereby will have a slant +45° polarization.

The first and second dipole radiators 420-1, 420-2 together have a shape similar to the Greek letter χ (turned sideways in the view of FIG. 4B) when viewed from the front. In the depicted embodiment, dipole radiators 420-1, 420-2 are implemented on a common printed circuit board 422, although multiple printed circuits boards can be used in other embodiments, and/or the dipole radiators 420-1, 420-2 may be implemented using sheet metal or in other ways.

The feed stalks 410 may extend in a direction that is generally perpendicular to a plane defined by the printed circuit board 422. The feed stalks 410 may have RF transmission lines 412 formed thereon (see FIG. 4A) that are used to pass RF signals between the dipole radiators 420 and a feed network of a base station antenna that includes the tri-pol radiating element 400 (e.g., base station antenna 300 of FIGS. 3A-3B). The feed stalks 410 may be used to mount the dipole radiators 420 at an appropriate distance in front of the reflector 318 of base station antenna 300, which is often approximately 3/16 to 1/4 of an operating wavelength. The “operating wavelength” refers to the wavelength corresponding to the center frequency of the operating frequency band of the radiating element 400. Moreover, while the dipole radiators 420-1, 420-2 extend in a plane that is generally parallel to the plane defined by an underlying reflector, it will be appreciated that in other embodiments the dipole arms 420-1, 420-2 could be rotated 90° along their respective longitudinal axes to be perpendicular to the reflector (or rotated at some other angle). The low-band radiating element 400 may be designed, for example, to operate in some or all the 617-960 MHz frequency band.

As shown in FIG. 4B, the first through fourth dipole arms 430-1 through 430-4 each extend from a central region of the printed circuit board 422 where the feed stalks 410-1, 410-2 electrically connect to the dipole radiator printed circuit board 422. The third dipole arm 430-3 extends generally upwardly from the central region, the fourth dipole arm 430-4 extends generally downwardly from the central region, and the first and second dipole arms 430-1, 430-2 both extend generally laterally to a first side of the central region.

Each dipole arm 430 may be formed as a metal pattern on printed circuit board 422. Each metal pattern includes a plurality of widened conductive members 424 that are connected by narrowed trace sections 426. The narrowed trace sections 426 may be implemented as meandered conductive traces. Herein, a meandered conductive trace refers to a non-linear conductive trace that follows a meandered path to increase the path length thereof. The meandered conductive trace sections 426 may have extended lengths yet still have a small physical footprint.

As shown in FIG. 4B, each dipole arm 430 may comprise a loop that includes a series of alternating widened conductive members 424 and narrowed trace sections 426. Each pair of adjacent widened conductive members 424 may be physically and electrically connected by a respective one of the narrowed trace sections 426. Since the narrowed trace sections 426 have a small physical footprint, adjacent widened conductive members 424 may be in close proximity to each other so that the widened conductive members 424 together appear as a single dipole arm at frequencies within the operating frequency range of the low-band radiating element 400. It will be appreciated that in other embodiments, the dipole arms need not have a closed loop design as explained, for example, in the '513 publication (e.g., the distal ends of two segments that form the loop may not be electrically connected to each other).

As shown best in FIG. 4B, the widened conductive member at the base or "root" of each dipole arm 430 has a slot 428 formed therethrough. These slots 428 extend all the way through the printed circuit board 422. Tabs (FIG. 4A) on each feed stalk 410 (which may be feed stalk printed circuit boards) may extend through the respective slots 428 allowing the feed stalks 410 to be electrically connected to the respective dipole arms 430, either through galvanic or capacitive connections. The feed stalks 410 may be positioned directly behind the slots 428 when the radiating element 400 is viewed from the front. As is readily apparent, the feed stalks 410 are not positioned at the horizontal center of the radiating element 400, but instead are offset to one side. As such, the radiating element 400 can be positioned closer to a side of a reflector of a base station antenna than say, for example, the cross-dipole radiating element 200 discussed above.

The narrowed meandered trace sections 426 are designed to act as high impedance sections that interrupt currents associated with nearby upper mid-band radiating elements (e.g., radiating elements 342 of base station antenna 300) that otherwise would be induced on the dipole arms 430. As discussed above, when a nearby upper mid-band radiating element 342 transmits and receives signals, the upper mid-band RF signals may tend to induce currents on the dipole arms 430 of the low-band radiating element 400. The narrowed meandered trace sections 426 are designed to create the high impedance for upper mid-band currents without significantly impacting the ability of the low-band currents to flow on the dipole arms 430.

Each widened conductive member 424 may have a respective width W1, where the width W1 is measured in a direction that is generally perpendicular to the direction of current flow along the respective widened conductive member 424. The narrowed trace sections 426 may similarly have widths W2, where each width W2 is measured in a direction that is generally perpendicular to the direction of instantaneous current flow. The average width of each widened conductive member 424 may be, for example, at least twice the average width of each narrowed trace section 426 in some embodiments. In other embodiments, the average width of each widened conductive member 424 may be at least three times, at least five times, or at least seven times the average width of each narrowed trace section 426.

The radiating element 400 further includes a narrowed trace segment 440 that is connected between the first dipole arm 430-1 and the second dipole arm 430-2. The narrowed trace segment 440 may be implemented, for example, as a meandered trace segment on the printed circuit board 422. In some embodiments, the narrowed trace segment 440 may be formed on the same side of the printed circuit board as the dipole arms 430, while in other embodiments, the narrowed trace segment 440 may be formed on the opposite side of the printed circuit board 422 from the dipole arms 430. Other arrangements are possible. The narrowed trace segment 440 may (as shown) have a "square wave" pattern so as to allow the trace to have a long length while occupying a small physical area on the printed circuit board 422. In the depicted embodiment, a first end of the narrowed trace segment 440 directly connects to a middle portion of the first dipole arm 430-1 and a second end of the narrowed trace segment 440 connects to a middle portion of the second dipole arm 430-2. The narrowed trace segment 440 may act as an inductor.

The narrowed trace segment 440 is longer than the narrowed trace sections 426 of the dipole arms 430. The length of the trace segments/sections 426/440 is the sum of the lengths of the individual segments thereof. In some embodiments, the narrowed trace segment 440 may be at least twice as long or at least three times as long as any of the narrowed trace sections 426 of the dipole arms 430. Consequently, an inductance of the narrowed trace segment 440 may exceed an inductance of any of the inductive trace segments 426 in the first and second dipole arms 430. The inductance of the narrowed trace segment 440 may be selected to increase isolation between the first and second dipole radiators 420-1, 420-2.

As discussed above, each dipole arm 430 may form a conductive loop. In some embodiments, each conductive loop may include a first conductive segment and a second conductive segment that each extend from a central region of the printed circuit board 422 toward an outer periphery of the printed circuit board 422, and the narrowed trace segment 440 may be coupled between a middle region of the first conductive segment of the first dipole arm 430-1 and a middle region of the second conductive segment of the second dipole arm 430-2.

In some embodiments, at least a portion of the narrowed trace segment 440 may be interposed between one of the first widened conductive members 424 on the first dipole arm 430-1 and one of the second widened conductive members on the second dipole arm 430-2. In the depicted embodiment, almost the entire inductor 440 is interposed between respective widened conductive members 424 on the first and second dipole arms 430-1, 430-2.

The narrowed trace segment 440 is within the "footprint" of the dual-polarized radiating element. Herein, the "footprint" of a radiating element refers to the smallest rectangle that encloses all four dipole arms of the radiating element when the radiating element is viewed directly from the front. In many base station antenna designs, a goal is to decrease the size of the radiating elements as much as possible so that more arrays of radiating elements can be included within the antenna without increasing the size of the antenna. By locating the inductors 440 within the footprint of the radiating element, the size of the radiating element is not increased, which means that the techniques of the present invention may be implemented, in many instances, without having to increase the size of the radiating elements.

While a narrowed trace segment 440 is used to form an inductive element in the embodiment of FIGS. 4A-4B, it will be appreciated that other inductive elements may be used. For example, a surface mount inductor chip could be mounted on the printed circuit board 422 and electrically connected between the first dipole arm 430-1 and the second dipole arm 430-2 in place of the narrowed trace segment 440. In another embodiment, the inductor could be implemented using a so-called "solenoid" design within the printed circuit board as disclosed in U.S. Pat. No. 9,905,973, the entire content of which is incorporated herein by reference. Thus, it will be appreciated that a wide variety of different inductive elements may be used.

Figure 4C:
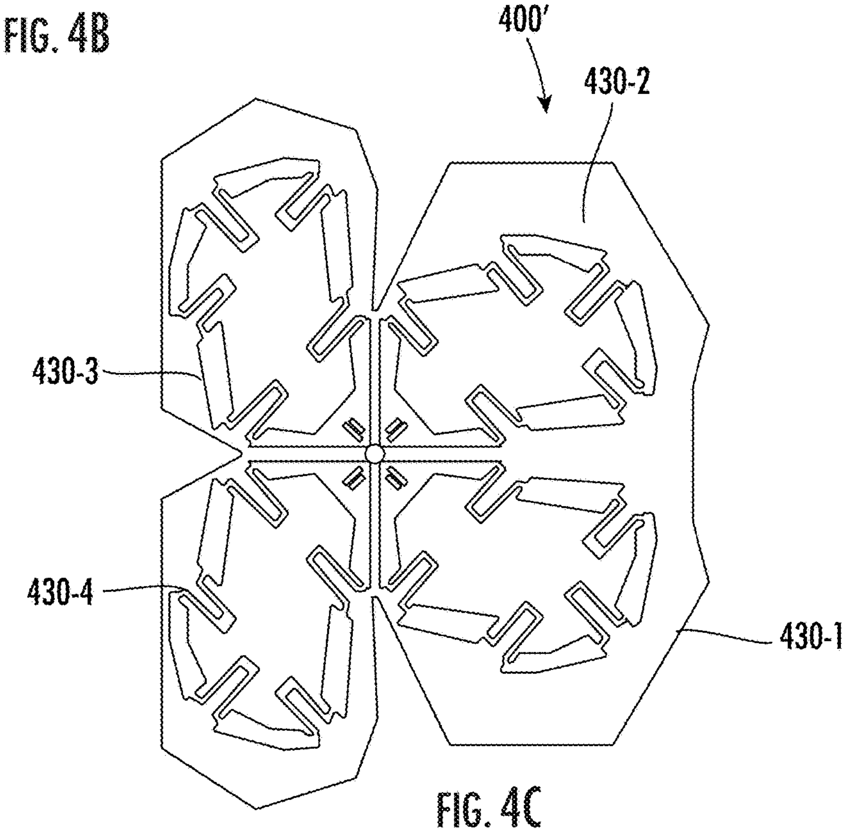
FIG. 4C is a front view of the modified tri-pol low-band radiating element of FIG. 4A with the inductor omitted.

FIG. 4C is a front view of a radiating element 400' which corresponds to the modified tri-pol low-band radiating element 400 of FIG. 4A with the inductor omitted. Simulations of the radiating elements 400 and 400' were performed to quantify the effect that adding the inductor 440 has on the performance of radiating element 400'.

Figure 5A:
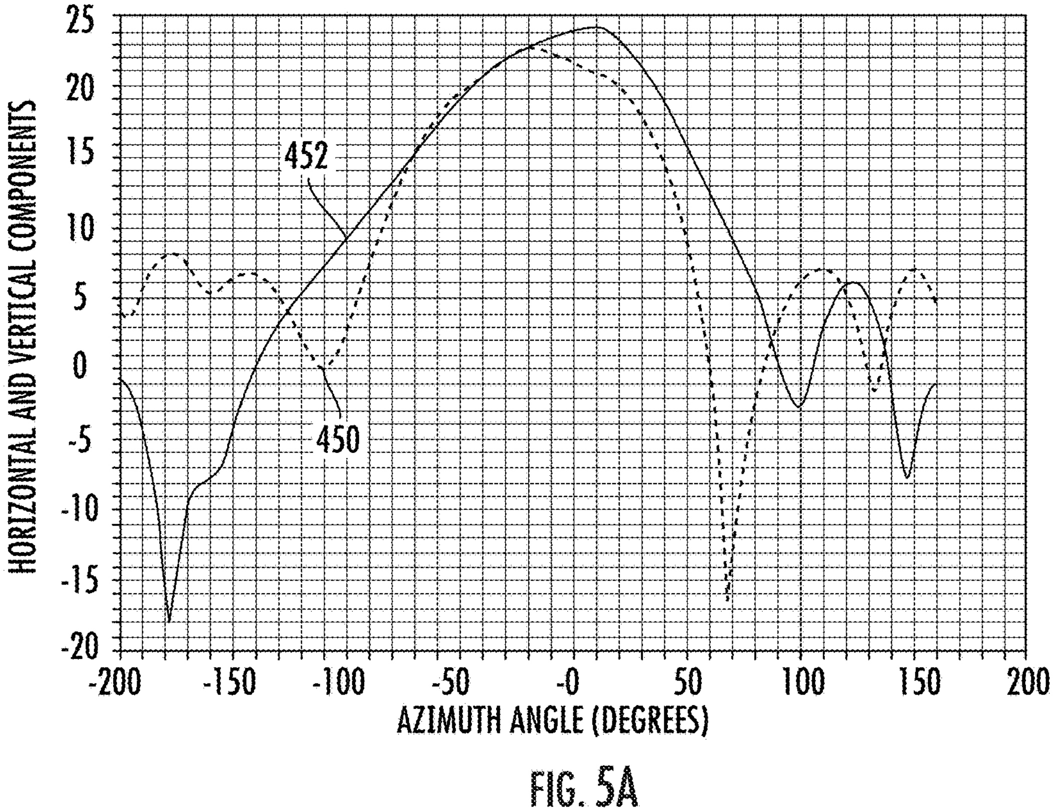
FIGS. 5A and 5B are graphs showing the horizontal and vertical components of the azimuth pattern at the worst case frequency in the operating frequency band for the radiating elements of FIGS. 4C and 4A, respectively.
Figure 5B:
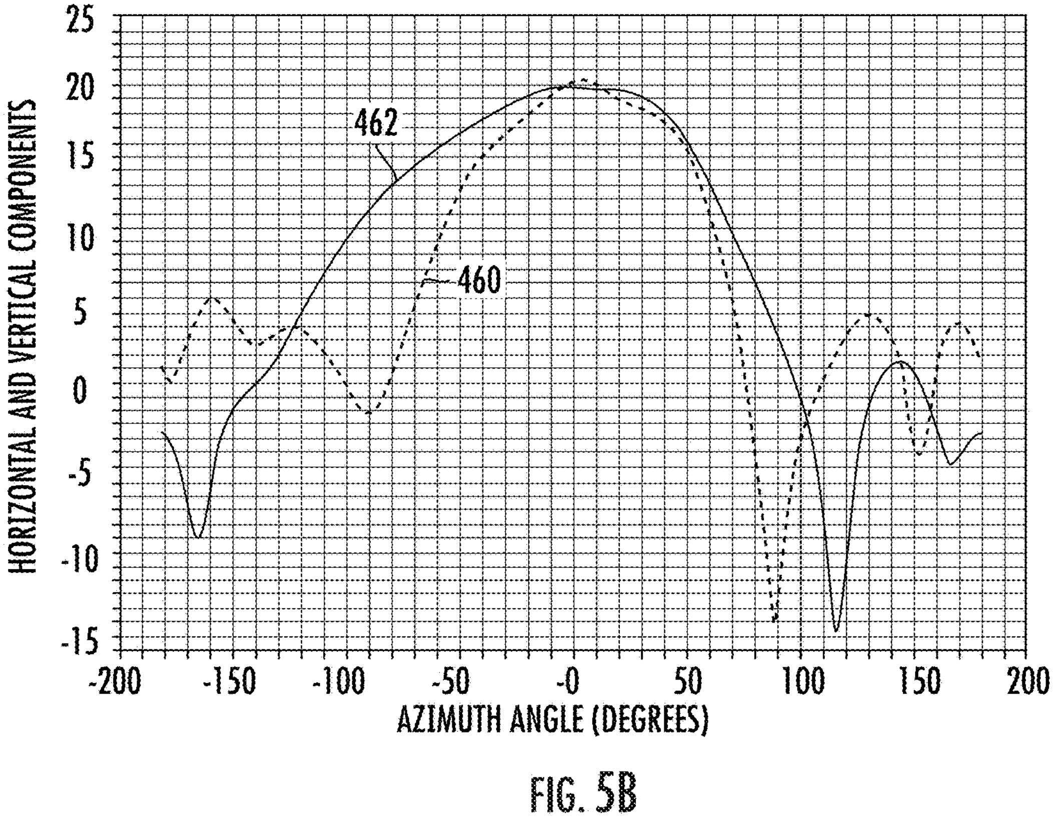

FIGS. 5A and 5B are graphs showing the horizontal and vertical components of the azimuth pattern at the worst case frequency in the operating frequency band for the radiating elements of FIGS. 4C and 4A, respectively. Here, the worst case frequency (i.e., the frequency where the cross-polarization performance is the poorest) is 960 MHz. For an ideal slant +45° or −45° radiating element, the horizontal and vertical components of the radiation pattern will be identical, over the full sector covered by the antenna, for all frequencies within the operating frequency band of the radiating element. Such performance, of course, cannot be achieved in practice.

As shown in FIG. 5A, for the radiating element 400' (which does not include inductor 440), the horizontal component (curve 450) and the vertical component (curve 452) of the azimuth pattern are generally similar within the sector (the sector extends between −60° and)+60°, but at azimuth angles above about 10° the two components start to diverge, with variations in gain of about 2-4 dB over azimuth angles between about 10° to the edge of the sector (60°). This indicates that the polarization purity is not particularly good for this part of the antenna pattern, which will result in reduced cross-polarization isolation.

In contrast, FIG. 5B illustrates the horizontal component (curve 460) and the vertical component (curve 462) of the azimuth pattern for the radiating element 400 which includes inductor 440. As can be seen by comparing the two graphs, the horizontal and vertical components are more similar in FIG. 5B than in FIG. 5A, indicating improved cross-polarization isolation performance. Note that the horizontal component (curves 450 and 460) is almost identical in the graphs of FIGS. 5A-5B, indicating that the inductor 400 primarily impacts the vertical component of the pattern. This is because the addition of the inductor 440 tends to increase current on the vertical dipole arm while decreasing the current on the horizontal dipole arm of the excited dipole radiator 420.

Figure 6A:
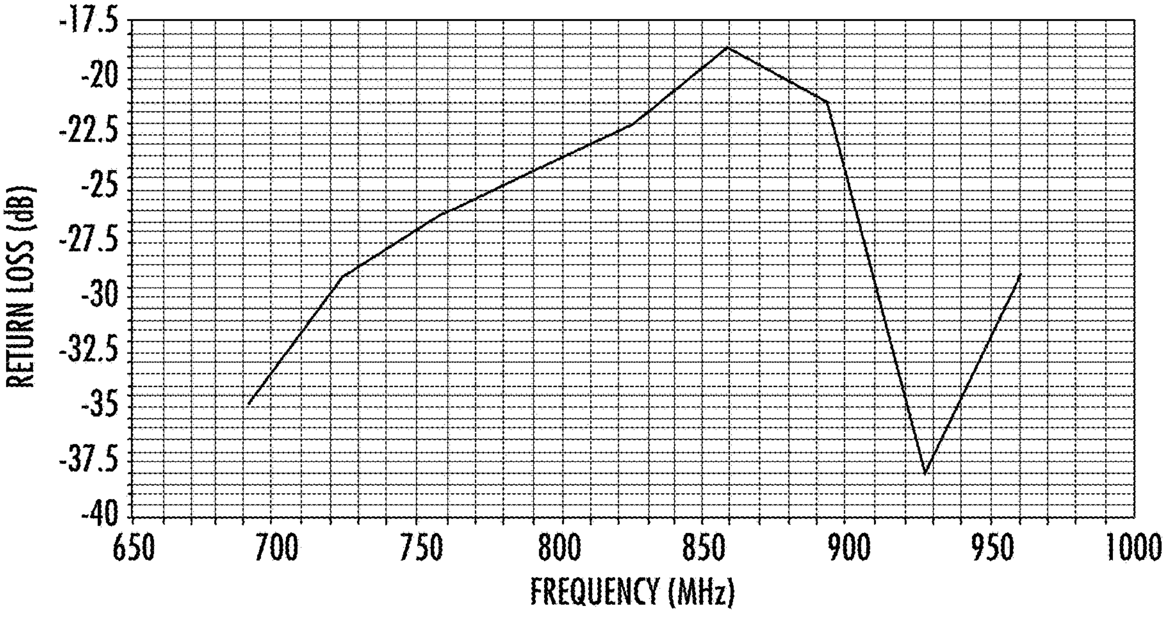
FIGS. 6A and 6B are graphs showing the return loss as a function of frequency for the radiating elements of FIGS. 4C and 4A, respectively.
Figure 6B:
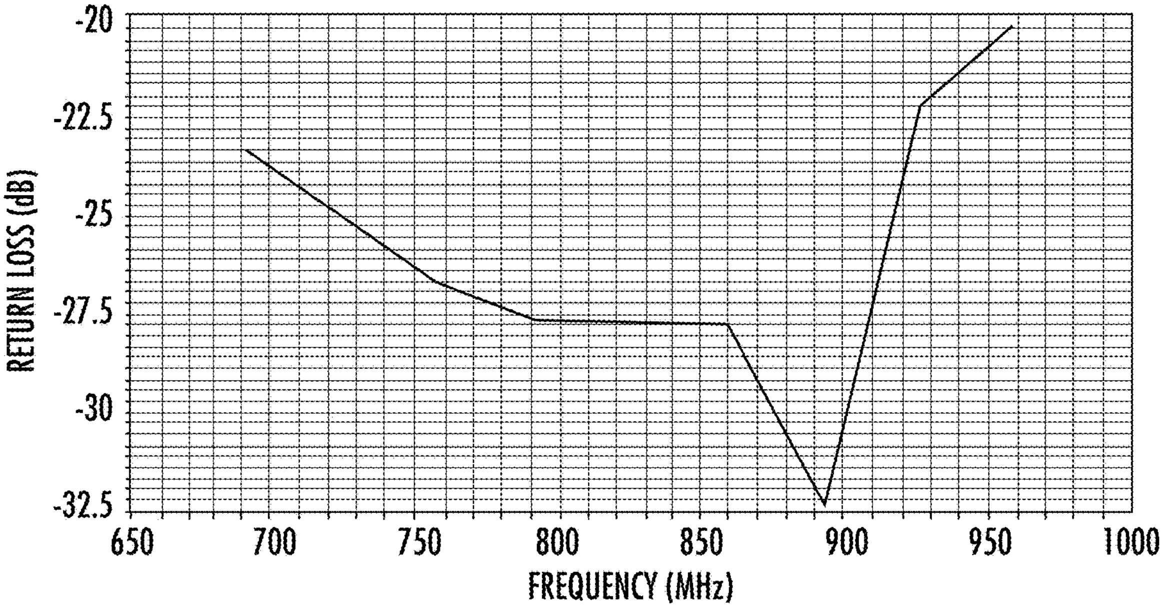

The addition of the inductor 440 may also improve the impedance match between the radiating element 400 and the feed network to which is attached. This can be seen with reference to FIGS. 6A and 6B, which are graphs showing the return loss as a function of frequency for the radiating elements of FIGS. 4C and 4A, respectively. As shown in FIG. 6A, the return loss for radiating element 400' (which does not include an inductor) peaks at about −18 dB at a frequency of about 860 MHz. In contrast, FIG. 6B shows that the return loss for radiating element 400 according to embodiments of the present invention (which includes the inductor 440) peaks at less than −20 dB at a frequency of 960 MHz. Since the goal is to keep the return loss below a specified value across the entire operating frequency band, radiating element 400 would be considered to represent more than a 2 dB improvement in return loss performance.

While not shown herein, simulations were performed that further confirmed that the shape of the radiation pattern generated by radiating element 400 and the cloaking performance thereof were comparable or better than comparable conventional radiating elements.

Figure 7A:
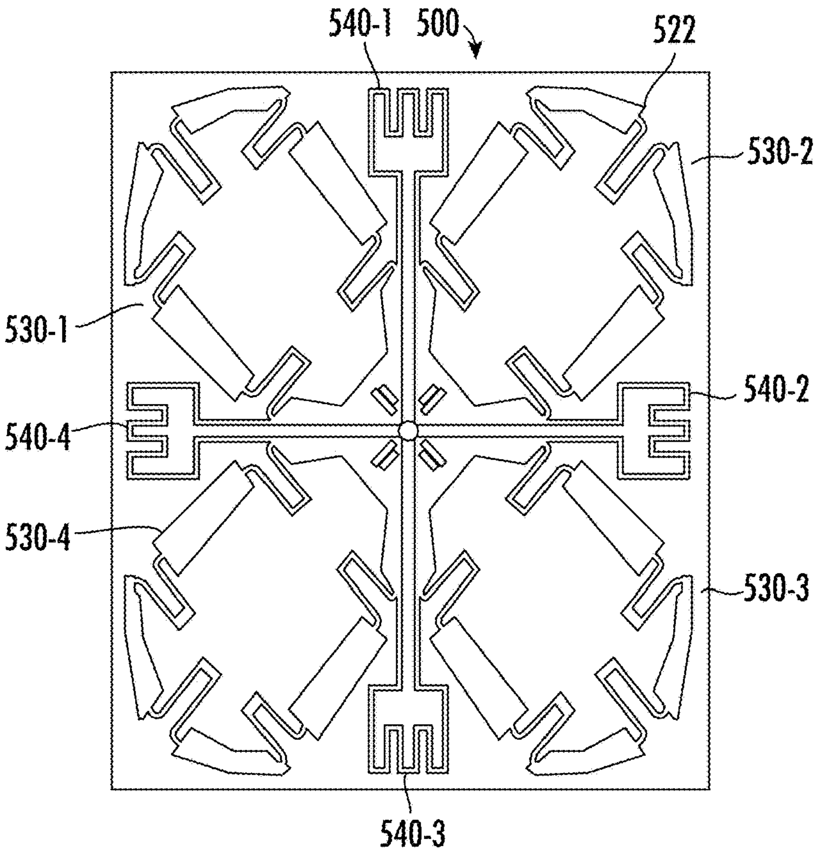
FIG. 7A is a schematic front view of a cross-dipole radiating element according to further embodiments of the present invention.

FIG. 7A is a schematic front view of a cross-dipole radiating element 500 according to embodiments of the present invention. The cross-dipole radiating element 500 is similar to one of the cloaking cross-dipole radiating elements disclosed in the above-referenced '513 application, but further includes four inductors 540-1 through 540-4. As shown in FIG. 7A, each inductor 540 can be implemented as a narrowed conductive trace segment that is connected between two adjacent dipole arms 540. Inductor 540-1 is connected between dipole arms 530-1 and 530-2, inductor 540-2 is connected between dipole arms 530-2 and 530-3, inductor 540-3 is connected between dipole arms 530-3 and 530-4, and inductor 540-4 is connected between dipole arms 530-4 and 530-1. If the dipole arms 530 are formed on a dipole radiator printed circuit board 522, as shown, the inductors 540 may also be conveniently implemented as metal patterns on the same printed circuit board 522.

Figure 7B:
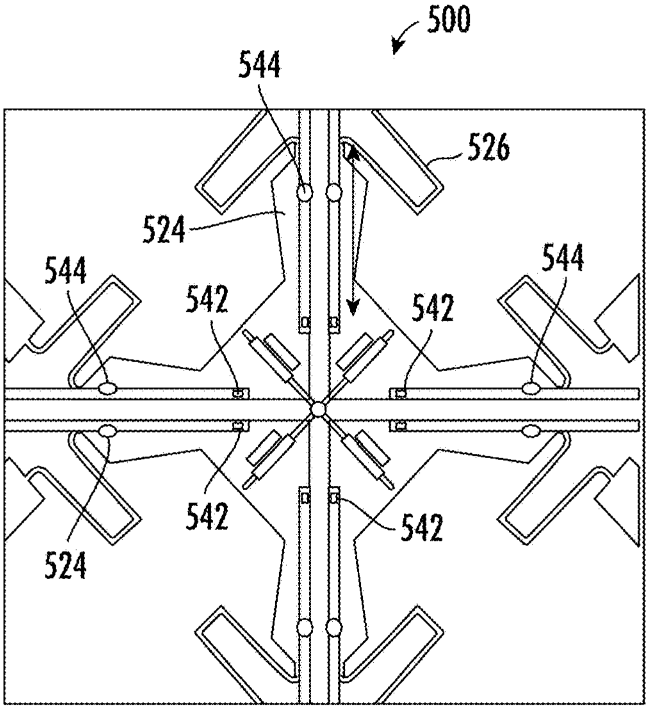
FIG. 7B is an enlarged transparent rear view of a center section of the dipole radiator printed circuit board of the cross-dipole radiating element of FIG. 7A.

When a dipole radiator printed circuit board 522 is used, in some embodiments, the dipole arms 540 may be formed on a first side of a dielectric substrate of the dipole radiator printed circuit board 522 and the inductive trace segments 540 may be formed on a second side of the dielectric substrate of the dipole radiator printed circuit board 522 that is opposite the first side. This is schematically shown in FIG. 7B, which is an enlarged transparent rear view of the center section of the dipole radiator printed circuit board 522. As shown in FIG. 7B, the end portions 542 of each inductor 540 extend nearly to the middle of the dipole radiator printed circuit board 522 directly behind the metallization forming the base of the dipole arms 530, where the two ends of each inductor 540 are directly behind the metallization of two adjacent dipole arms 530. Eight plated through holes 544 extend through the dielectric substrate of the dipole radiator printed circuit board 522 to electrically connect the eight ends 542 of the inductors 540 to the four dipole arms 540. It has been found that the cross-polarization isolation performance may be tuned by selecting the location of the plated through holes 544. In the depicted embodiment, the plated through holes 544 are located adjacent the distal ends of the first widened conductive member 524 (starting at the base of the dipole arm 540) of each of the two segments that form the conductive loop dipole arms 540. Simulations show that the radiating element 500 achieved a maximum cross-polarization isolation of −30 dB, while an otherwise identical radiating element that omitted the inductors 540 achieved a maximum cross-polarization isolation of −27 dB. This shows that the inductors 540 provide about 3 dB improvement in cross-polarization isolation performance.

Generally speaking, the cross-polarization isolation performance of a radiating element may be a function of the distance (measured in wavelengths of the wavelength corresponding to the center frequency of the operating frequency band of the radiating element) between adjacent dipole arms of the radiating element. In particular, the closer the distance between dipole arms of different dipole radiators, the worse the cross-polarization isolation performance. Accordingly, the techniques according to embodiments of the present invention may be particularly beneficial when used in radiating elements that have the dipole arms of different dipole radiators in close proximity to each other.

Figure 8A:
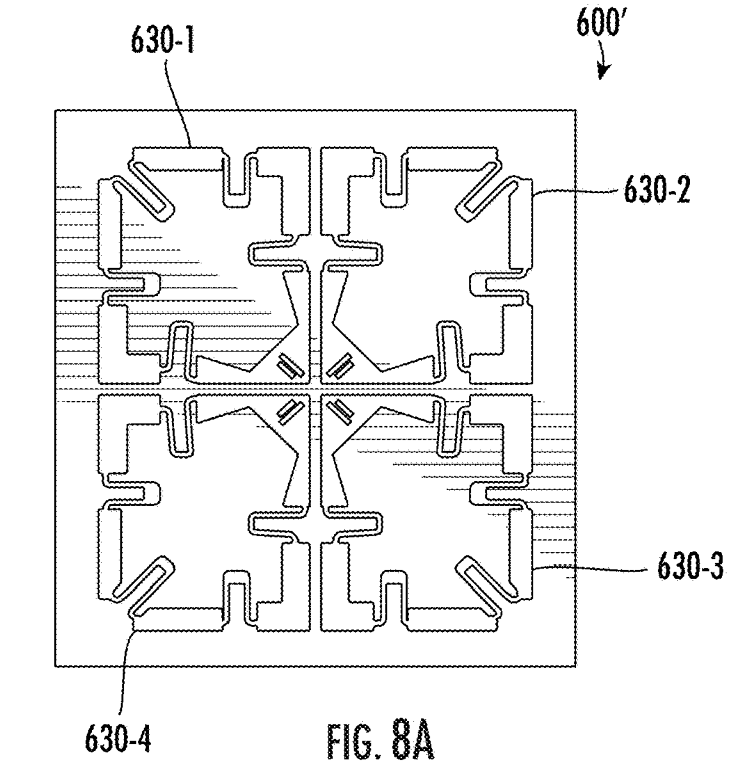
FIG. 8A is a schematic front view of a square cross-dipole radiating element.

One conventional radiating element that has dipole arms of different dipole radiators in close proximity to each other is the so-called "square" cross-dipole radiating element. FIG. 8A is a schematic front view of a square cross-dipole radiating element 600' that includes cloaked dipole arms 630-1 through 630-4 that are in the form of generally square-shaped conductive loops. As is readily apparent, for each dipole arm 630, a first quarter of the conductive loop directly abuts a portion of a first adjacent dipole arm 630, while a second quarter of the conductive loop directly abuts a portion of a second adjacent dipole arm 630. Simulations show that the square cross-dipole radiating element 600' has a maximum cross-polarization isolation of −13.7 dB.

Figure 8B:
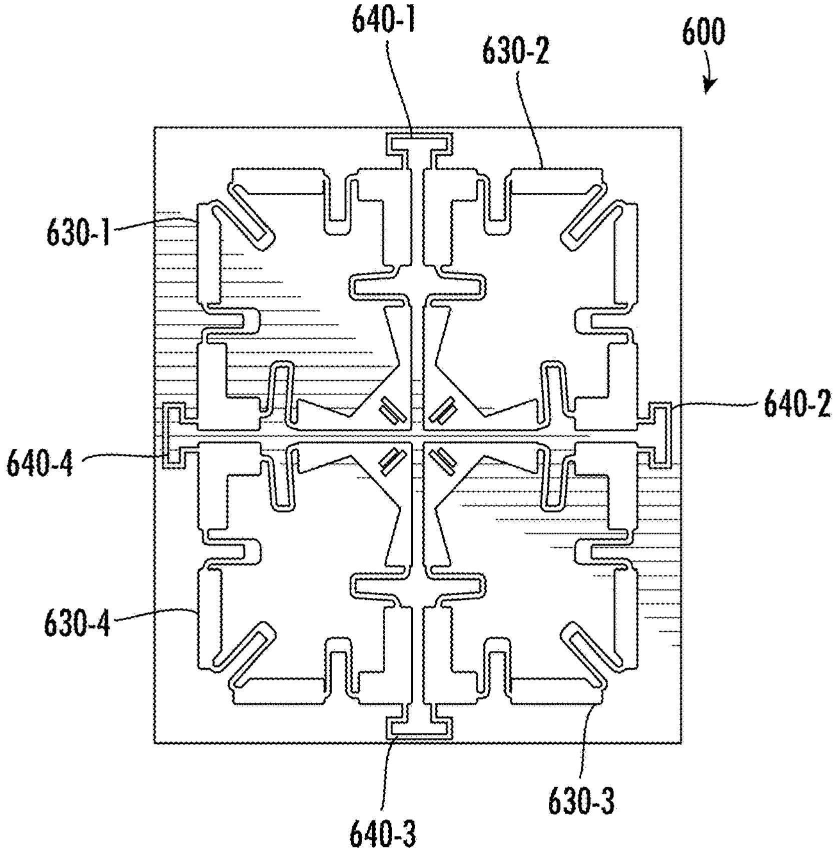
FIG. 8B is a schematic front view of a modified version of the square cross-dipole radiating element of FIG. 8A according to still further embodiments of the present invention.

FIG. 8B is a schematic front view of a square cross-dipole radiating element 600 according to embodiments of the present invention. The square cross-dipole radiating element 600 is identical to the square cross-dipole radiating element 600' of FIG. 8A except that the square cross-dipole radiating element 600 further includes four inductors 640-1 through 640-4 that are interposed between the dipole arms 630, with inductor 640-1 connected between dipole arms 630-1 and 630-2, inductor 640-2 connected between dipole arms 630-2 and 630-3, inductor 640-3 connected between dipole arms 630-3 and 630-4, and inductor 640-4 connected between dipole arms 630-4 and 630-1. Because the dipole arms 630 are spaced so closely together, the inductors 640 in this embodiment are outside the footprint of the radiating element 600. Simulations show that the radiating element 600 achieves a maximum cross-polarization isolation of −21 dB, which is more than a 7 dB improvement as compared to radiating element 600'.

Figure 9:
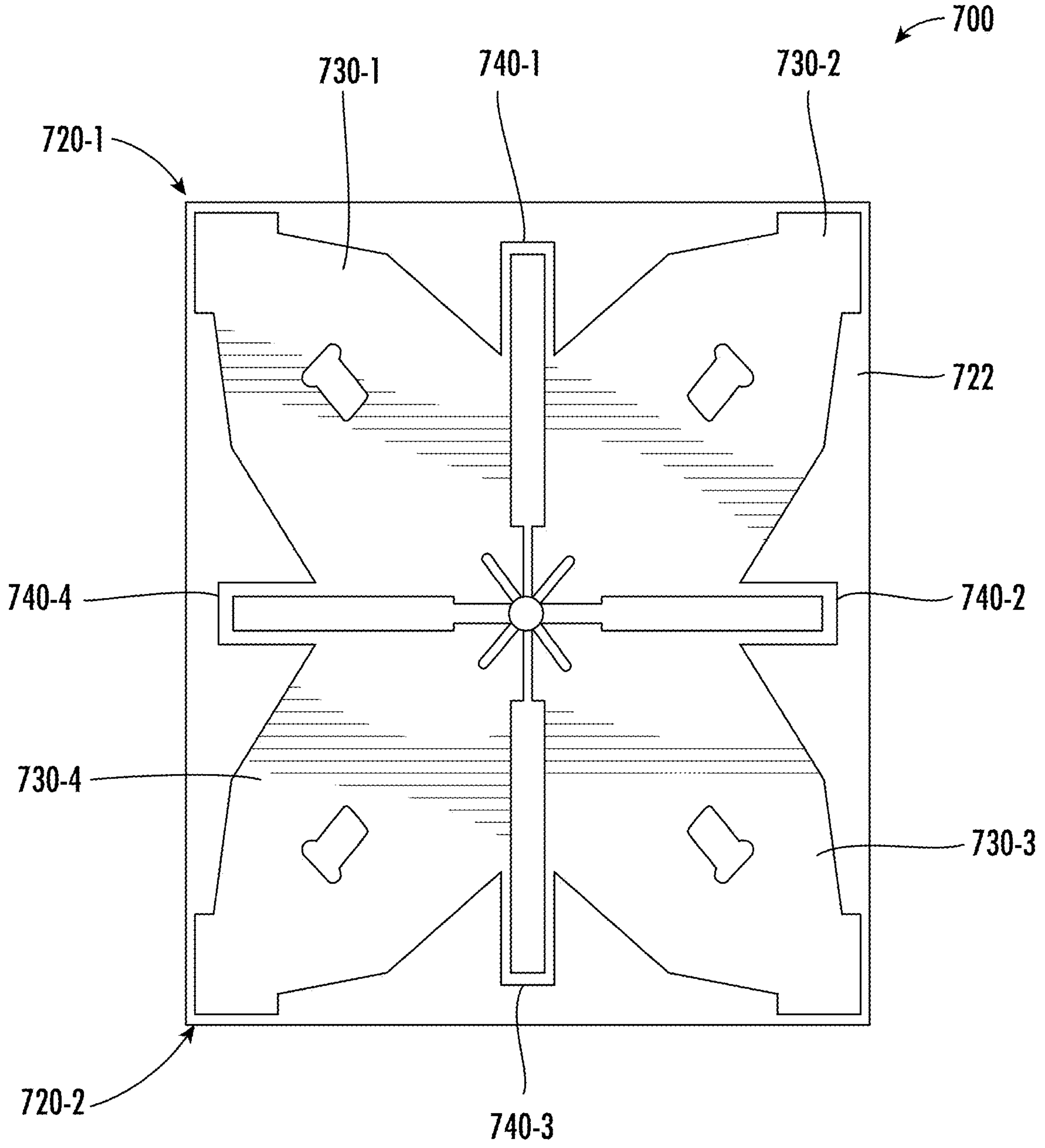
FIG. 9 is a schematic front view of a cross-dipole radiating element according to yet additional embodiments of the present invention.

While the above examples have focused on cloaked radiating elements that have dipole arms that are designed to be transparent in other frequency bands, it will be appreciated that the techniques disclosed herein are not limited to such cloaked radiating elements. For example, FIG. 9 is a schematic front view of the dipole radiator printed circuit board 722 of a cross-dipole radiating element 700 according to yet additional embodiments of the present invention. The cross-dipole radiating element 700 is a mid-band "cloverleaf" style radiating element that includes four metal dipole arms 730-1 through 730-4 which form a pair of dipole radiators 720-1, 720-2. The four dipole arms 730-1 through 730-4 merge together in the middle of the dipole radiator printed circuit board 722 and are center-fed in a manner similar to the other radiating elements discussed herein.

As shown in FIG. 9, radiating element 700 further includes four inductors 740-1 through 740-4 that are interposed between adjacent dipole arms 730 following the techniques according to embodiments of the present invention. Simulations show that the radiating element 700 achieves a maximum cross-polarization isolation of −28.5 dB, as compared to a maximum cross-polarization isolation of −23 dB for a version of the radiating element that omits the inductor 740.

While the discussion above primarily (but not exclusively) focuses on low-band radiating elements, it will be appreciated that the techniques discussed above can be used with radiating elements that operate in any appropriate frequency band.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A dual-polarized radiating element for a base station antenna, comprising:

a first dipole radiator that includes a first dipole arm and a third dipole arm;

a second dipole radiator that includes a second dipole arm and a fourth dipole arm; and a first inductor coupled between the first dipole arm and the second dipole arm, wherein each of the first dipole arm, the second dipole arm, the third dipole arm and the fourth dipole arm extend outwardly from a central region, and wherein the first inductor is positioned outside of the central region.

2. The dual-polarized radiating element of claim 1, further comprising a feed stalk, where the feed stalk is positioned rearwardly of the central region.

3. The dual-polarized radiating element of claim 1, wherein the first inductor is directly connected between the first dipole arm and the second dipole arm but is not directly connected to the third dipole arm.

4. The dual-polarized radiating element of claim 3, wherein the first inductor not directly connected to the fourth dipole arm.

5. The dual-polarized radiating element of claim 1, further comprising a first feed stalk printed circuit board and a second feed stalk printed circuit board, where the first feed stalk printed circuit board electrically connects to the first dipole arm at a first location and electrically connects to the third dipole arm at a third location, and the second feed stalk printed circuit board electrically connects to the second dipole arm at a second location and electrically connects to the fourth dipole arm at a fourth location, wherein the central region is a region that is within a rectangle defined by the first through fourth locations.

6. The dual-polarized radiating element of claim 1, wherein the first inductor is at least partially positioned in between the first dipole arm and the second dipole arm, and no part of the first inductor is positioned in between the first dipole arm and the fourth dipole arm, the second dipole arm and the third dipole arm, or the third dipole arm and the fourth dipole arm.

7. A dual-polarized radiating element for a base station antenna, comprising:

- a first dipole radiator that includes a first dipole arm and a third dipole arm;
- a second dipole radiator that includes a second dipole arm and a fourth dipole arm; and
- a first inductor coupled between the first dipole arm and the second dipole arm,
- wherein an inductance of the first inductor is selected to increase isolation between the first and second dipole radiators.

8. The dual-polarized radiating element of claim 7, wherein each of the first dipole arm, the second dipole arm, the third dipole arm and the fourth dipole arm extend outwardly from a central region, and the first inductor is positioned outside of the central region.

9. The dual-polarized radiating element of claim 7, wherein the first through fourth dipole arms meet in a central region of the radiating element, and the third dipole arm extends upwardly from the central region, the fourth dipole arm extends downwardly from the central region, and the first and second dipole arms both extend to the right from the central region.

10. The dual-polarized radiating element of claim 7, wherein the first inductor is directly connected between the first dipole arm and the second dipole arm but is not directly connected to the third dipole arm.

11. The dual-polarized radiating element of claim 10, wherein the first inductor not directly connected to the fourth dipole arm.

12. The dual-polarized radiating element of claim 7, wherein the first inductor is at least partially positioned in between the first dipole arm and the second dipole arm, and no part of the first inductor is positioned in between the first dipole arm and the fourth dipole arm, the second dipole arm and the third dipole arm, or the third dipole arm and the fourth dipole arm.

13. A dual-polarized radiating element for a base station antenna, comprising:

- a first dipole radiator that includes a first dipole arm and a third dipole arm;
- a second dipole radiator that includes a second dipole arm and a fourth dipole arm; and
- a first inductor coupled between the first dipole arm and the second dipole arm,
- wherein the first through fourth dipole arms meet in a central region of the radiating element, and the third dipole arm extends upwardly from the central region, the fourth dipole arm extends downwardly from the central region, and the first and second dipole arms both extend to the right from the central region.

14. The dual-polarized radiating element of claim 13, wherein the first dipole radiator is configured to transmit RF radiation having slant −45° polarization, and the second dipole radiator is configured to transmit RF radiation having slant +45° polarization.

15. The dual-polarized radiating element of claim 13, wherein the first inductor is directly connected between the first dipole arm and the second dipole arm but is not directly connected to the third dipole arm.

16. The dual-polarized radiating element of claim 15, wherein the first inductor not directly connected to the fourth dipole arm.

17. The dual-polarized radiating element of claim 13, wherein the first inductor is at least partially positioned in between the first dipole arm and the second dipole arm, and no part of the first inductor is positioned in between the first dipole arm and the fourth dipole arm, the second dipole arm and the third dipole arm, or the third dipole arm and the fourth dipole arm.

* * * * *